US010718225B2

United States Patent
Weaver et al.

(10) Patent No.: US 10,718,225 B2
(45) Date of Patent: Jul. 21, 2020

(54) PASSIVE GAS-LEAK MANAGEMENT SYSTEM

(71) Applicant: Bell Helicopter Textron Inc., Forth Worth, TX (US)

(72) Inventors: Keith David Weaver, North Richland Hills, TX (US); David Angell, Fort Worth, TX (US); Stephen Dickison, Glastonbury, CT (US); David Michael Tiedeman, Hurst, TX (US); Nicholas Plagianos, N. Richland Hills, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 180 days.

(21) Appl. No.: 15/829,217

(22) Filed: Dec. 1, 2017

(65) Prior Publication Data

US 2019/0170005 A1  Jun. 6, 2019

(51) Int. Cl.
*F01D 11/00* (2006.01)
*G01M 3/00* (2006.01)

(52) U.S. Cl.
CPC .......... *F01D 11/005* (2013.01); *F01D 11/003* (2013.01); *G01M 3/002* (2013.01); *Y10T 137/5762* (2015.04)

(58) Field of Classification Search
CPC .... F01D 11/005; F01D 11/003; G01M 3/002; Y10T 137/5762
USPC ........................................................ 137/312
See application file for complete search history.

(56) References Cited

U.S. PATENT DOCUMENTS

| 313,393 A | * | 3/1885 | Westinghouse, Jr. ...... | F17D 5/02 138/148 |
| 5,862,834 A | * | 1/1999 | Ziu ........................... | F16L 7/00 138/108 |
| 6,129,107 A | * | 10/2000 | Jackson ................... | F16L 55/17 137/312 |
| 7,798,165 B2 | * | 9/2010 | McClung, Jr. .......... | F16K 17/34 137/312 |
| 8,893,742 B2 | * | 11/2014 | Buresi et al. ............. | F16L 9/19 137/312 |

OTHER PUBLICATIONS

Bell Helicopter, Flight International "Bell 525 Relentless" Nov. 12, 2014.
Perry, Dominic "Analysis: Bell 525 Relentless cutaway and technical Description" https://www.flightglobal.com/news/articles/analysis-bell-525-relentless-cutaway-and-technical-4055411, Source: Bell Helicopter,Flight International, London, Nov. 12, 2014, 8 pp.

* cited by examiner

*Primary Examiner* — Kevin L Lee
(74) *Attorney, Agent, or Firm* — Daniel J. Chalker; Edwin S. Flores; Chalker Flores, LLP (57) ABSTRACT

A gas-leak management system including a primary duct; and a leak-management duct, at least a portion of the leak-management duct surrounding at least a portion of the primary duct, wherein the leak-management duct includes a gap between the portion of the primary duct and the portion of the leak-management duct, and including one or more vent holes in fluid communication with the gap.

28 Claims, 5 Drawing Sheets

PASSIVE GAS-LEAK MANAGEMENT SYSTEM

CROSS-REFERENCE TO RELATED APPLICATIONS

Not Applicable.

STATEMENT OF FEDERALLY FUNDED RESEARCH

Not Applicable.

TECHNICAL FIELD OF THE INVENTION

The present invention relates in general to the field of management of leaks in aircraft systems, and more particularly, to a novel system for passive management of gas leaks for use in an aircraft.

BACKGROUND OF THE INVENTION

Without limiting the scope of the invention, its background is described in connection with management of gas leaks in aircraft systems.

One example of an aircraft is a rotorcraft. A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

Thus, a need remains for improving the overall safety and reliability of rotorcraft drive systems that include the connections between the engines and the main rotor gearbox, reduction and accessory gearboxes, shafts, generators, oil pumps, and accessories connected to the main rotor gearbox.

Several gases, for example bleed air, oxygen, etc. are used throughout the aircraft systems for multiple reasons. Bleed air from an aircraft's engine may be used for a number of purposes, including, e.g., cross-starting another engine, engine and airframe anti-icing, pressurizing a hydraulic reservoir, or other uses. Bleed air is typically hot and/or at high pressure, and it is typically routed from an engine to another location using a bleed-air duct. A hot and/or high-pressure leak from a bleed-air duct could damage an aircraft, compromising safety. One reason for an oxygen system is to provide breathable air at high altitude low oxygen environment. However due to the flammable nature of oxygen, a leak could be potentially catastrophic in a non-fireproof zone. Typically, a gas detection system for the protection of an aircraft uses a series of sensors and detectors that activates an alert when a leak is detected. Such a system requires electrical harnesses and/or connectors as well as sensors (e.g., pneumatic, electrical, thermal, etc.), significantly increasing the complexity of aircraft systems, the time and costs required for system installation, and the time and costs required for system maintenance. Potential and actual damage from the presence, temperature and/or pressure of a gas leak also requires additional inspection and repair time and costs. An improved system and method for managing gas leaks is desirable.

SUMMARY OF THE INVENTION

In one embodiment, the present invention includes a gas-leak management system, including: a primary duct; and a leak-management duct, at least a portion of the leak-management duct surrounding at least a portion of the primary duct, wherein the leak-management duct forms a gap between the portion of the primary duct and the portion of the leak-management duct, and including one or more vent holes in fluid communication with the gap. In one aspect, one or more standoff brackets are mounted between the primary duct and the leak-management duct. In another aspect, the gap is an air gap or contains a porous material disposed within all or part of the gap. In another aspect, the primary duct and/or the leak-management duct includes a rigid material, a flexible material, or combinations thereof. In another aspect, the primary duct includes a metallic material, a non-metallic material, or a combination thereof. In another aspect, the leak-management duct includes thin-wall insulation. In another aspect, the one or more vent holes are located to vent a gas at one or more selected locations. In another aspect, the one or more selected locations are selected to direct the gas to one or more areas where the presence, temperature and/or pressure of the gas is acceptable. In another aspect, the one or more vent holes are oriented to vent the gas in one or more selected directions. In another aspect, the one or more selected directions are selected to direct the gas to one or more areas where the presence, temperature and/or pressure of the gas is acceptable. In another aspect, a primary-duct coupling attaches a first section of the primary-duct to a second section of the primary duct, and a coupling cover attaches a first section of the leak-management duct to a second section of the leak-management duct, wherein the coupling cover is disposed over the primary-duct coupling.

In another embodiment, the present invention includes a method of managing gas leaks, including: surrounding at least a portion of a primary duct with at least a portion of a leak-management duct to form a gap between the at least a portion of the primary duct and the at least a portion of the leak-management duct; and placing one or more vent holes in the leak-management duct in fluid communication with the gap. In one aspect, the method further includes mounting one or more standoff brackets between the primary duct and the leak-management duct. In another aspect, the gap is an air gap. In another aspect, the method further includes placing a porous material within all or part of the gap. In another aspect, the method further includes forming the primary duct and/or the leak-management duct from a rigid material, a flexible material, or combinations thereof. In another aspect, the method further includes forming the primary duct from a metallic material, a non-metallic material, or a combination thereof. In another aspect, the method further includes forming the leak-management duct from thin-wall insulation. In another aspect, the method further includes placing the one or more vent holes in the leak-management duct to vent a gas at one or more selected locations. In another aspect, the method further includes placing the one or more vent holes in the leak-management duct to direct the gas to one or more areas where the presence, temperature and/or pressure of the gas is acceptable. In another aspect, the method further includes orienting the one or more vent holes in the leak-management duct to direct the gas in one or more selected directions. In another aspect, the method further includes orienting the one or more vent holes in the leak-management duct to direct the gas to one or more areas where the presence, temperature and/or pressure of the gas is acceptable. In another aspect, the method further includes attaching a first section of the primary duct to a second section of the primary duct using a primary-duct coupling, and attaching a first section of the leak-management duct to a second section of the leak-management duct using a coupling cover, wherein the coupling cover is disposed over the primary-duct cover to form the gap between the primary-duct coupling and the coupling cover.

In another embodiment, the present invention includes a vehicle, including: a compartment disposed within the vehicle; a primary duct coupled to the compartment or a component disposed within the compartment; and a leak-management duct coupled to the primary duct to form a gap between at least a portion of the main duct and at least a portion of the leak-management duct, wherein the leak-management duct has one or more vent holes in fluid communication with the gap. In one aspect, the vehicle comprises an aircraft, watercraft, above or below ground vehicle, or spacecraft; and the compartment comprises an engine compartment. In another aspect, one or more standoff brackets are mounted between the primary duct and the leak-management duct. In another aspect, the gap is an air gap or contains a porous material disposed within all or part of the gap. In another aspect, the primary duct and/or the leak-management duct includes a rigid material, a flexible material, or combinations thereof. In one aspect, the primary duct includes metallic material, a non-metallic material, or a combination thereof. In one aspect, the leak-management duct includes thin-wall insulation. In one aspect, the one or more vent holes are located to vent a gas at one or more selected locations. In one aspect, the one or more selected locations are selected to direct the gas to one or more areas where the presence, temperature and/or pressure of the gas is acceptable. In another aspect, a primary-duct coupling attaches a first section of the primary-duct to a second section of the primary duct, and a coupling cover attaches a first section of the leak-management duct to a second section of the leak-management duct, wherein the coupling cover is disposed over the primary-duct coupling.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
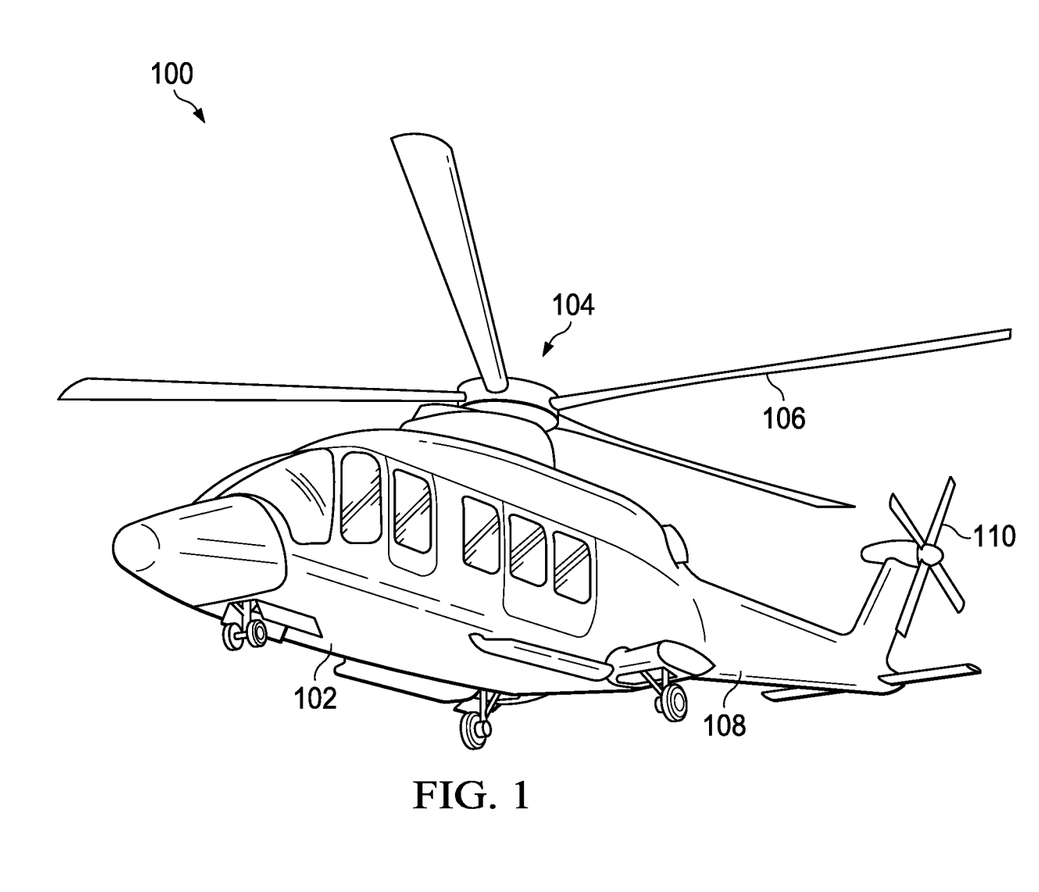
FIG. 1 shows a side view of a helicopter according to a particular embodiment of the present application.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
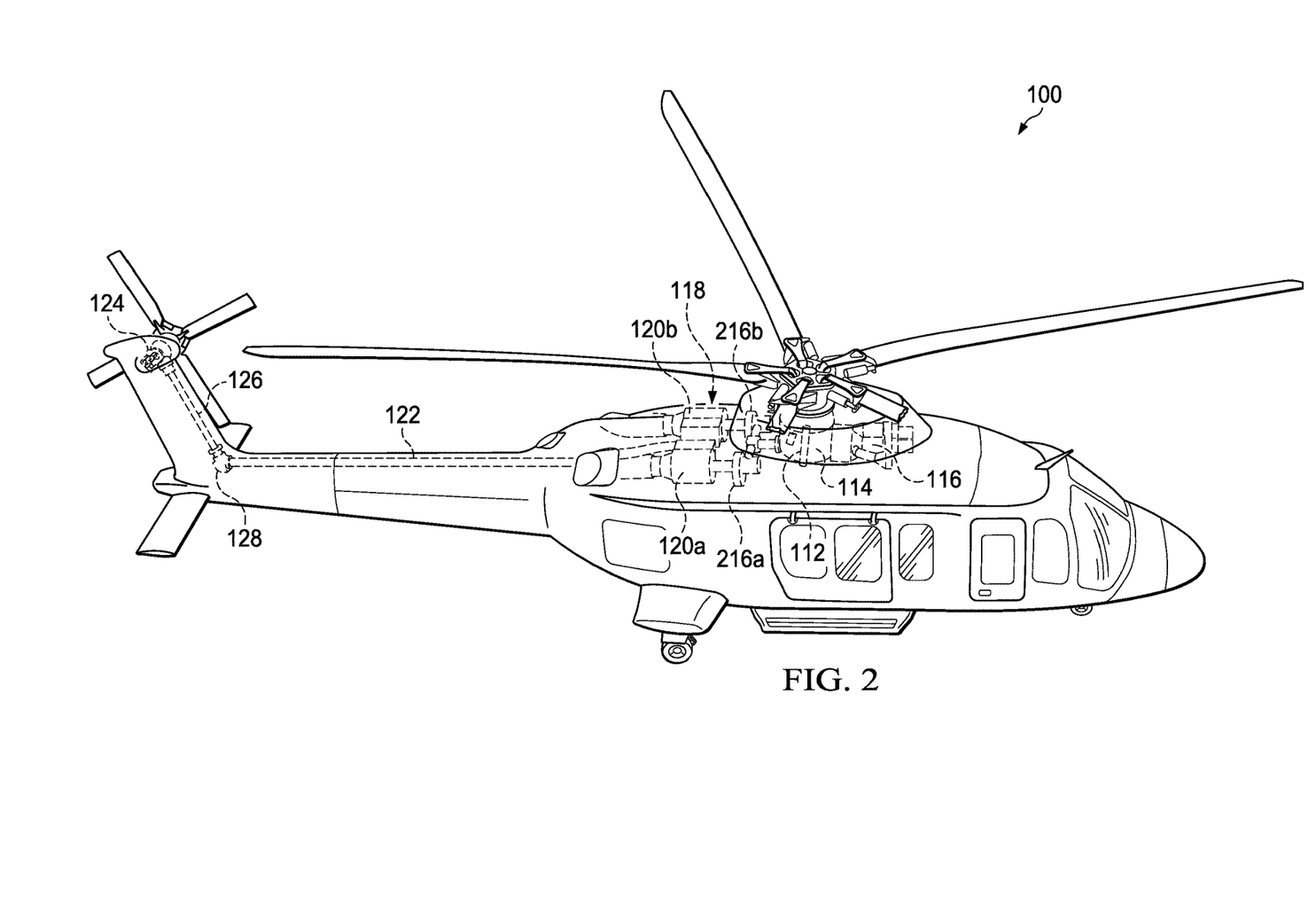
FIG. 2 shows a partial cross-section, perspective view of a helicopter aircraft according to an embodiment of the present application.

For example, FIG. 2 shows a partial cross-section perspective view of aircraft 100 that includes additional detail of an embodiment of the present invention. Aircraft 100 further includes a rotor mast 112, which is connected to the main rotor gearbox 114. The main rotor gearbox 114 is connected to one or more accessory gear boxes 116 and one or more reduction gearboxes 216a, 216b. Each reduction gearbox 216a, 216b is connected to one or more engines 120a, 120b, which are within an engine compartment 118. A tail rotor drive shaft 122 transmits mechanical rotation from the main rotor gearbox 114 to the tail rotor gear box 124, which is connected via tail rotor drive shaft 126 and intermediate gear box 128.

Figure 3A:
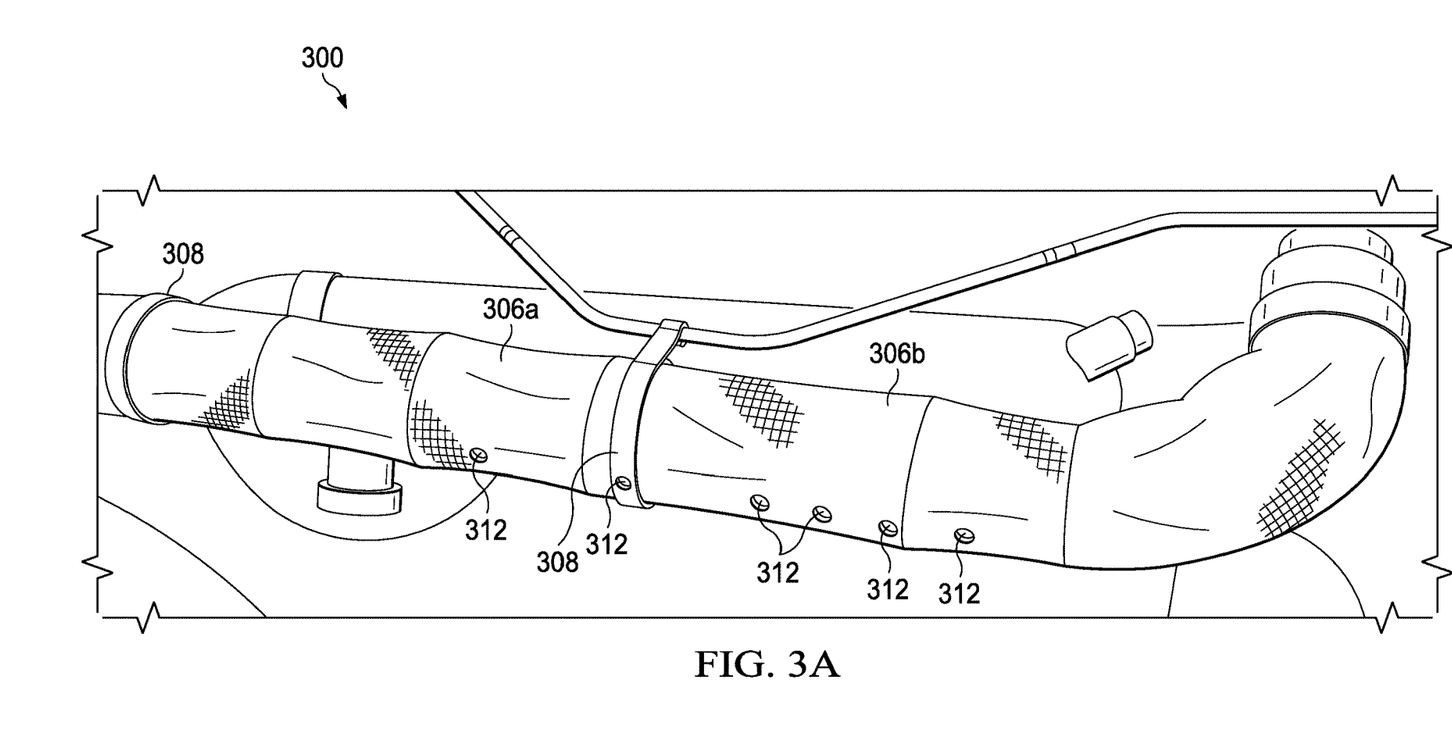
FIG. 3A shows a portion of an embodiment of the present invention.
Figure 3B:
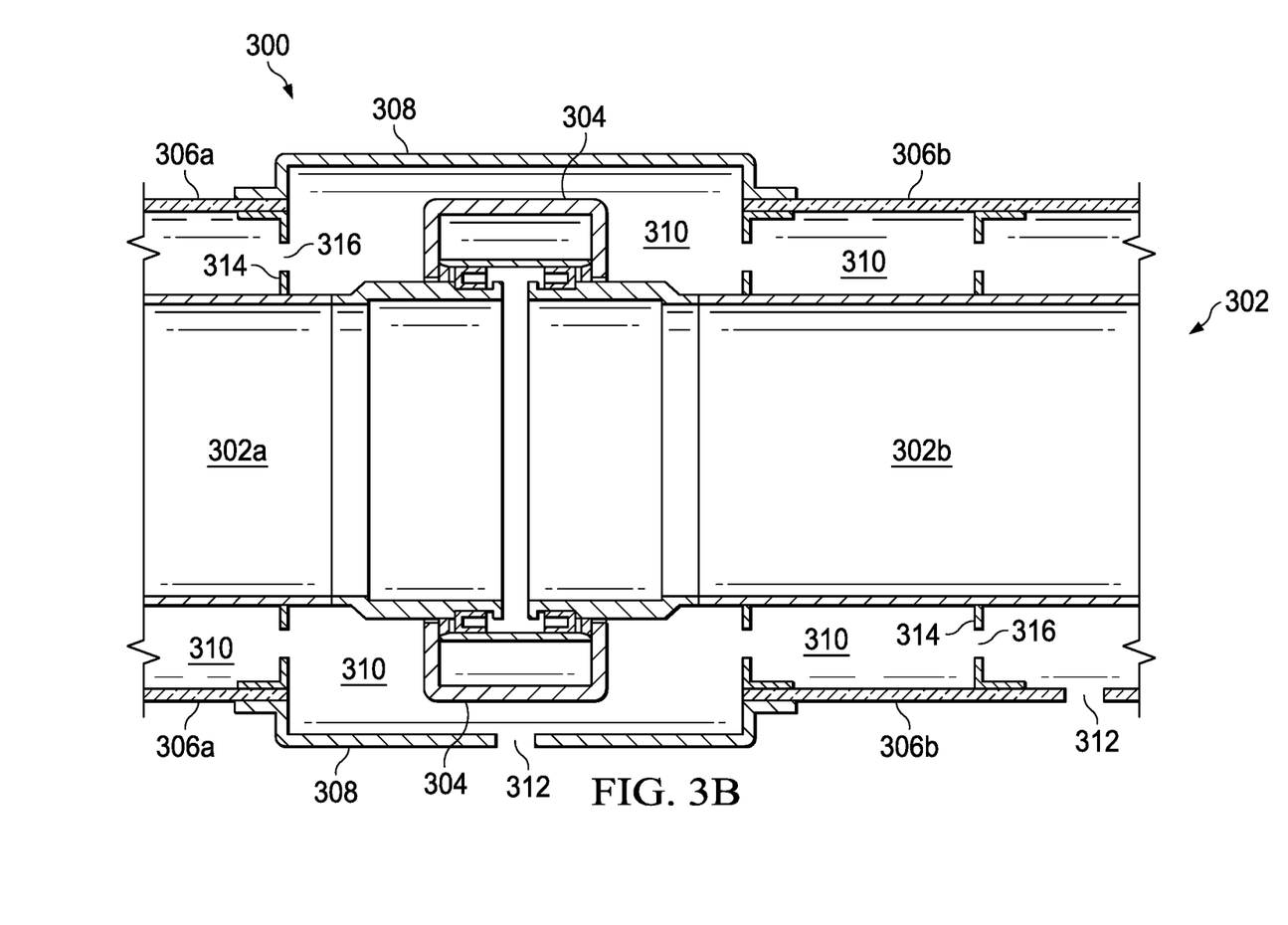
FIG. 3B, shows a cross-sectional view of a portion of an embodiment of the present invention.

Referring now to FIGS. 3A and 3B, a gas-leak management system 300 and a cross section thereof are shown that illustrates an embodiment of the present invention. The gas-leak management system 300 can be connected to any component or system on the rotorcraft 100. Typically, the gas-leak management system 300 will be used with components or systems that create hot and/or pressurized air or gas (e.g., engine compartment, engine, accessory power unit, shaft driven compressor, etc.). But, the gas-leak management system 300 can also be used with compartments or systems where the presence of the gas (e.g., air, oxygen, carbon dioxide, etc.) is detrimental to aircraft operations and/or crew/passengers (e.g., flammable, harmful, etc.).

Leak-management duct 306a, 306b surrounds a primary duct 302 to form a gap 310. Coupling cover 308 is also shown. One or more vent holes 312 are placed in the leak-management duct 306a, 306b and/or the coupling cover 308 in fluid communication with the gap 310. Further, the gas-leak management system 300 may also include rigid or flexible insulation or a combination thereof.

A primary duct 302 carries bleed gas that may be hot and/or at high pressure, in which the primary duct 302 includes at least primary-duct segments 302a and 302b. One or more primary-duct couplings 304 couple a first primary-duct segment 302a to a second primary-duct segment 302b. At least a portion of the first and second primary-duct segments 302a, 302b are surrounded by at least a portion of a first section of the leak-management duct 306a and second section of the leak-management duct 306b, for example at a location outside a fire zone of aircraft, forming gap 310. The primary duct 302 and/or the leak-management duct 306a, 306b can be made of a rigid material, a flexible material, or combinations thereof. Moreover, the primary duct 302 can be made of a metallic material, a non-metallic material, or a combination thereof. The leak-management duct 306a, 306b can be made of a thin-wall insulation or other material that forms an air tight or near air tight barrier such that gas is only exhausted from the specified vent holes 312 as described below.

The gap 310 is maintained using standoff brackets 314 connected between the primary duct 302 and leak-management duct 306a, 306b at various locations. The standoff brackets 314 may or may not have holes 316 disposed therein to provide gas paths and reduce weight. In some embodiments, the standoff brackets 314 may be disk-shaped with holes 316 and encircle the primary duct 302. Leak-management ducts 306a, 306b have a lower touch temperature than that of primary ducts 302a, 302b and contain and manage gas leaking from primary duct 302. Near and around each primary-duct coupling 304, coupling cover 308 couples the first section of the leak-management duct 306a to the second section of the leak-management duct 306b forming gap 310 around primary-duct coupling 304 and primary duct segments 302a, 302b. Coupling cover 308 may be a clamshell cover or other cover design that connects and seals the leak-management duct 306a, 306b. One or more vent holes 312 are placed in leak-management duct 306a, 306b and/or the coupling cover 308 in fluid communication with the gap 310.

If primary duct 302a, 302b or primary-duct coupling 304 of the primary-duct coupling 304 leaks bleed air, the leaked bleed gas leaks into gap 310. The leaked bleed gas then flows from gap 310 through the one or more vent holes 312. The one or more vent holes 312 may be located at one or more selected locations, e.g., to direct leaked bleed gas to one or more areas where the presence, temperature and/or pressure of the leaking bleed gas is acceptable for safety of the aircraft and its systems and components. The one or more vent holes 312 may be oriented in one or more selected directions, e.g., to direct leaked bleed gas to one or more areas where the presence, temperature and/or pressure of the leaking bleed gas is acceptable for safety of aircraft and its systems and components. In some embodiments, a porous material (not shown) that provides gas path(s) to the vent holes 312 can be used between the primary duct 302 and the leak-management duct 306a, 306b instead of or in combination with the gas within the gap 310, in which case the standoff brackets 314 may not be necessary. As a result, the porous material can be disposed in all or part of the gap 310. Note that the gas-leak management system 300 is not limited to flowing air and can be used for any flowing gas. For example, the gas-leak management system 300 can be used to vent flammable vapors to designated location(s). Note that FIGS. 3A-3B are only examples of the gas-leak management system 300 and are not intended to limit the scope or implementation of the gas-leak management system 300. The gas-leak management system 300 can be used anywhere on any vehicle (e.g., aircraft, watercraft, above or below ground vehicles, spacecraft, etc.) and is not limited to use on rotorcraft or in an engine compartment.

Figure 4:
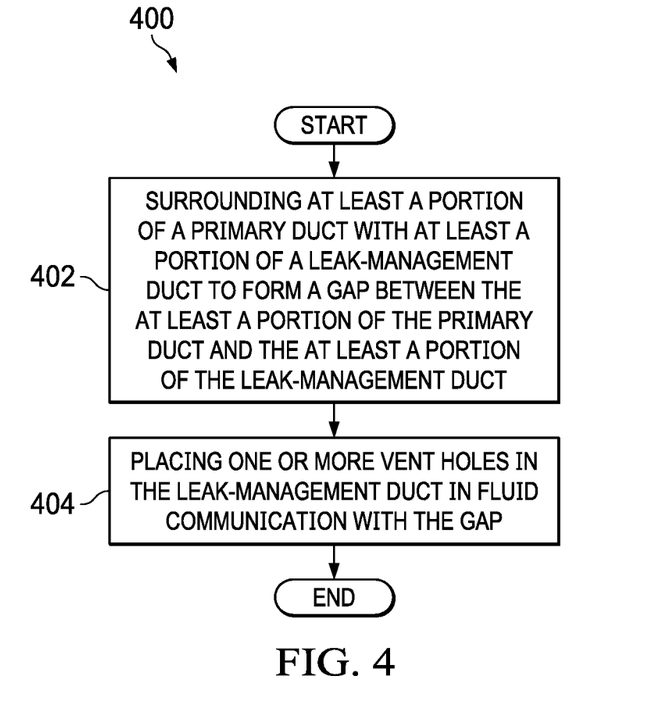
FIG. 4 shows a flowchart of an embodiment of the present invention.

Referring now to FIG. 4, a flowchart of a method 500 of managing gas leaks illustrates an embodiment of the present invention. The method 500 may begin at block 502 by surrounding at least a portion of a primary duct segments 302a, 302b with at least a portion of a leak-management duct 306a, 306b to form a gap 310 between the at least a portion of the primary duct segments 302a, 302b and the at least a portion of the leak-management duct 306a, 306b. The method 500 may conclude at block 504 by placing one or more vent holes 312 in the leak-management duct 306a, 306b and/or coupling cover 308 in fluid communication with the gap 310.

In another embodiment, the present invention includes a vehicle, including: a compartment disposed within the vehicle; a primary duct coupled to the compartment or a component disposed within the compartment; and a leak-management duct coupled to the primary duct to form a gap between at least a portion of the main duct and at least a portion of the leak-management duct, wherein the leak-management duct has one or more vent holes in fluid communication with the gap. In one aspect, the vehicle comprises an aircraft, watercraft, above or below ground vehicle, or spacecraft; and the compartment comprises an engine compartment. In another aspect, one or more standoff brackets are mounted between the primary duct and the leak-management duct. In another aspect, the gap is an air gap or contains a porous material disposed within all or part of the gap. In another aspect, the primary duct and/or the leak-management duct includes a rigid material, a flexible material, or combinations thereof. In one aspect, the primary duct includes metallic material, a non-metallic material, or a combination thereof. In one aspect, the leak-management duct includes thin-wall insulation. In one aspect, the one or more vent holes are located to vent a gas at one or more selected locations. In one aspect, the one or more selected locations are selected to direct the gas to one or more areas where the presence, temperature and/or pressure of the gas is acceptable. In another aspect, a primary-duct coupling attaches a first section of the primary-duct to a second section of the primary duct, and a coupling cover attaches a first section of the leak-management duct to a second section of the leak-management duct, wherein the coupling cover is disposed over the primary-duct coupling.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention.

As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A gas-leak management system, comprising:
   a primary duct comprising a first section and a second section that carry a gas;
   a primary-duct coupling attaching the first section of the primary duct to the second section of the primary duct;
   a leak-management duct comprising a first section and a second section, at least a portion of the leak-management duct surrounding at least a portion of the primary duct, wherein the leak-management duct forms a gap between the portion of the primary duct and the portion of the leak-management duct, and comprising one or more vent holes in fluid communication with the gap;
   a coupling cover attaching the first section of the leak-management duct to the second section of the leak-management duct, wherein the coupling cover is disposed over the primary-duct coupling; and
   wherein the one or more vent holes are located at one or more selected locations and direct any gas that leaks from the primary duct into the leak-management duct to one or more safe areas outside the leak-management duct.

2. The system of claim 1, further comprising one or more standoff brackets mounted between the primary duct and the leak-management duct.

3. The system of claim 1, wherein the gap comprises an air gap.

4. The system of claim 1, further comprising a porous material disposed within all or part of the gap.

5. The system of claim 1, wherein:
   the primary duct and/or the leak-management duct comprise a rigid material, a flexible material, or combinations thereof; or
   the primary duct comprises a metallic material, a non-metallic material, or a combination thereof; or the leak-management duct is made of a material that forms an air-tight or near-tight barrier such that the gas is only exhausted from the one or more vent holes.

6. The system of claim 1, wherein the one or more safe areas comprise one or more areas where a presence, temperature and/or pressure of the gas is acceptable.

7. The system of claim 1, wherein the one or more vent holes are oriented to vent the gas in one or more selected directions.

8. The system of claim 7, wherein the one or more selected directions direct the gas to the one or more safe areas where a presence, temperature and/or pressure of the gas is acceptable.

9. The system of claim 1, wherein the one or more safe areas are safe for a vehicle and systems and components of the vehicle.

10. A method of managing gas leaks, comprising:
attaching a first section of a primary duct to a second section of the primary duct using a primary-duct coupling;
surrounding at least a portion of the primary duct that carries a gas with at least a portion of a leak-management duct to form a gap between the at least a portion of the primary duct and the at least a portion of the leak-management duct;
attaching a first section of the leak-management duct to a second section of the leak-management duct using a coupling cover wherein the coupling cover is disposed over the primary-duct cover to form the gap between the primary-duct coupling and the coupling cover; and
placing one or more vent holes in the leak-management duct in fluid communication with the gap, wherein the one or more vent holes are located at one or more selected locations and direct any gas that leaks from the primary duct into the leak-management duct to one or more safe area outside the leak-management duct.

11. The method of claim 10, further mounting one or more standoff brackets between the primary duct and the leak-management duct.

12. The method of claim 10, wherein the gap comprises an air gap.

13. The method of claim 10, further placing a porous material within all or part of the gap.

14. The method of claim 10, further comprising:
forming the primary duct and/or the leak-management duct from a rigid material, a flexible material, or combinations thereof; or
forming the primary duct from a metallic material, a non-metallic material, or a combination thereof; or
forming the leak-management duct from a material that forms an air-tight or near-tight barrier such that the gas is only exhausted from the one or more vent holes.

15. The method of claim 10, wherein the one or more safe areas comprise one or more areas where a presence, temperature and/or pressure of the gas is acceptable.

16. The method of claim 10, further comprising orienting the one or more vent holes in the leak-management duct to direct the gas in one or more selected directions.

17. The method of claim 10, further comprising orienting the one or more vent holes in the leak-management duct to direct the gas to the one or more safe areas where the presence, temperature and/or pressure of the gas is acceptable.

18. The method of claim 10, wherein the one or more safe areas are safe for a vehicle and systems and components of the vehicle.

19. A vehicle, comprising:
a compartment disposed within the vehicle;
a primary duct coupled to the compartment or component within the compartment, wherein the primary duct comprises a first section and a second section that carry a gas;
a primary-duct coupling attaching the first section of the primary duct to the second section of the primary duct;
a leak-management duct comprising a first section and a second section coupled to the primary duct to form a gap between at least a portion of the main duct and at least a portion of the leak-management duct, wherein the leak-management duct has one or more vent holes in fluid communication with the gap;
a coupling cover attaching the first section of the leak-management duct to the second section of the leak-management duct, wherein the coupling cover is disposed over the primary-duct coupling; and
wherein the one or more vent holes are located at one or more selected locations and direct any gas that leaks from the primary duct into the leak-management duct to one or more safe areas outside the leak-management duct.

20. The vehicle of claim 19, wherein:
the vehicle comprises an aircraft, watercraft, above or below ground vehicle, or spacecraft; and
the compartment comprises an engine compartment.

21. The vehicle of claim 19, further comprising one or more standoff brackets mounted between the primary duct and the leak-management duct.

22. The vehicle of claim 19, wherein the gap comprises an air gap.

23. The vehicle of claim 19, further comprising a porous material disposed within all or part of the gap.

24. The vehicle of claim 19, wherein:
the primary duct and/or the leak-management duct comprise a rigid material, a flexible material, or combinations thereof; or
the primary duct comprises a metallic material, a non-metallic material, or a combination thereof; or
the leak-management duct is made of a material that forms an air-tight or near-tight barrier such that the gas is only exhausted from the one or more vent holes.

25. The vehicle of claim 19, wherein the one or more safe areas comprise one or more areas where the presence, temperature and/or pressure of the gas is acceptable.

26. The vehicle of claim 19, wherein the one or more vent holes are oriented to vent the gas in one or more selected directions.

27. The vehicle of claim 26, wherein the one or more selected directions direct the gas to the one or more safe areas where a presence, temperature and/or pressure of the gas is acceptable.

28. The vehicle of claim 19, wherein the one or more safe areas are safe for the vehicle and systems and components of the vehicle.

* * * * *